United States Patent [19]

Moffatt

[11] Patent Number: 4,490,773
[45] Date of Patent: Dec. 25, 1984

[54] CAPACITIVE PRESSURE TRANSDUCER

[75] Inventor: E. Marston Moffatt, Glastonbury, Conn.

[73] Assignee: United Technologies Corporation, Hartford, Conn.

[21] Appl. No.: 562,627

[22] Filed: Dec. 19, 1983

[51] Int. Cl.³ .......................... H01G 7/00; G01L 9/12
[52] U.S. Cl. ...................................... 361/283; 73/718
[58] Field of Search ........................... 361/283; 73/718

[56] References Cited

U.S. PATENT DOCUMENTS

| | | | |
|---|---|---|---|
| 3,405,559 | 10/1968 | Moffatt | 361/283 X |
| 3,479,879 | 11/1969 | Music | 73/718 |
| 4,064,549 | 12/1977 | Cretzler | 361/283 |
| 4,389,895 | 6/1983 | Rud | 73/718 X |

Primary Examiner—Donald A. Griffin
Attorney, Agent, or Firm—Francis J. Maguire, Jr.

[57] ABSTRACT

The flexible membrane for sensing a differential pressure in a cylindrical sensor is made from a tube with heavy end rings that gradually taper down to form a flexible membrane such that stresses from membrane flexions are distributed throughout the end rings to prevent the stresses from being transmitted to the joints between the tube and its supporting structure thereby reducing hysteresis and creep deformation effects; temperature and stray capacitance effects are minimized by using the capacitive sensor in a tank circuit having an inductor integral to the transducer structure, the tank circuit oscillating at its resonant frequency for use in indicating the differential pressure.

9 Claims, 3 Drawing Figures

CAPACITIVE PRESSURE TRANSDUCER

DESCRIPTION

1. Technical Field

This invention relates to a capacitive pressure transducer with a structure particularly resistant to mechanical hysteresis and creep deformation and that has an output signal indicative of pressure induced variations in the frequency of oscillation of a tank circuit which is integral to the transducer structure.

2. Background Art

In the capacitive pressure transducer, pressure is generally applied to exert compressive forces on a flexible membrane which carries one plate of a capacitor and which deflects away from or toward a second plate which may be flexible or rigid. A change in the distance between the plates causes a change in the capacitance. However, for the transducer to have utility, a repeatable relationship must exist between changes in the applied pressure and the resultant capacitance changes. Repeatability has often been difficult to achieve in the prior art due to mechanical hysteresis and creep deformation effects in the membrane. Good repeatability has been obtained using a brittle material such as fused quartz which has a very small mechanical hysteresis factor and a low amount of creep deformation. Although these effects have been largely avoided in the membrane itself, they have been found to persist in the boundary at which the membrane is joined, often by brazing, to its supporting structure. Plastic deformation in the brazed joints under stress, a low elastic limit in the solder material between the joints, or rubbing the imperfectly welded joints all may continue to contribute to this persisting hysteresis effect.

For detecting the changes in capacitance the prior art often couples the sensing capacitor into a detection network such as a frequency sensitive detection circuit and changes in capacitance arising from the deflection of the membrane are transformed into an electrical signal directly related to the pressure being measured. Other analog techniques involving the transformation of change in capacitance to pressure have also been used. Such techniques often involve the use of detection circuitry internal or external to the body of the transducer. Connections between the sensing capacitor and the circuitry are often found to introduce stray capacitance to the sensing circuit which adversely effects the accuracy of the transducer. The separate and distinct structures and materials of the various components are affected differently by changes in temperature. If the sensing capacitor expands or contracts with temperature according to the temperature coefficient of the particular material from which it is constructed, and another associated component in the detection circuitry made of another material expands or contracts according to its own distinct coefficient, then temperature changes can adversely affect the detection circuitry's ability to accurately provide pressure signals.

DISCLOSURE OF INVENTION

The object of the present invention is to provide a capacitive pressure transducer that is considerably more accurate than currently known transducers.

According to a first aspect of the present invention, a cylindrical pressure transducer has an outer housing with a sensing capsule resiliently mounted inside, the space therebetween forming an outer annular chamber sealed at each end for receiving a gas under a pressure to be monitored, said capsule having an outer tube made with heavy end rings which taper down to a thin walled flexible membrane therebetween, said membrane having a first capacitor plate deposited on the inner surface thereof, said capsule having a rigid inner tube having said outer tube's end rings joined thereto and having a second capacitor plate deposited on the outer surface thereof closely confronting said first capacitor plate, the confronting surfaces forming an inner annular chamber that is sealed at each end and that communicates through an opening in the wall of the inner tube with a cylindrical chamber sealed at each end of said inner tube, both said cylindrical chamber and said inner annular chamber being at a selected pressure lower than said outer annular chamber pressure, said pressure in said outer annular chamber exerting compressive forces on said membrane causing it and said first capacitor plate to deflect toward said second capacitor plate thereby decreasing the radial distance and increasing the capacitive value therebetween in proportion to the difference between said pressure in said outer annular chamber and said selected pressure in said inner annular chamber.

During repeated flexing and also during long term exposure of said membrane to a particular pressure, said heavy end rings and said gradual taper thereof absorb and distribute stresses that would otherwise be transferred to the joined surfaces between said inner and outer tubes. The reduced strain to which said joints are thereby exposed greatly reduces the mechanical hysteresis and creep deformation effects exhibited by said transducer during said repeated flexing and also during said long term exposure to a particular pressure of said membrane. Reducing the hysteresis and creep deformation effects in this way greatly enhances the repeatability of the capacitive values obtained for each of the various pressure values to which the membrane is exposed even after repeated flexing and even after long term exposure to stretching forces at a particular pressure.

According to a second aspect of the present invention, an inductor having coils in the form of a right circular cylindrical helix are deposited on the inner surface of said inner tube, at least one end of said coils being connected to one of said capacitor plates, said inductor and said capacitor plates together forming a tank circuit which has a characteristic resonant frequency that varies according to the changes induced in said capacitive values by changes occurring in said monitored pressure.

During temperature changes the structure of the transducer is subjected to expansion and contraction in all its dimensions according to its temperature coefficient. Since the capacitor plates and the inductor are all integral to the structure and since the structure is constructed of the same material, e.g. fused quartz throughout, the dimensions of the plates and the inductor will change dimensions in the same ratio. Therefore, temperature changes that would otherwise induce differing structural changes in a capacitor and in an inductor not integral to the same structure are avoided. This reduces structurally induced deviations from the ideal temperature response of the transducer thereby enhancing the inherent accuracy of the device.

These and other objects, features and advantages of the present invention will become more apparent in

BEST MODE FOR CARRYING OUT THE INVENTION

Figure 1:
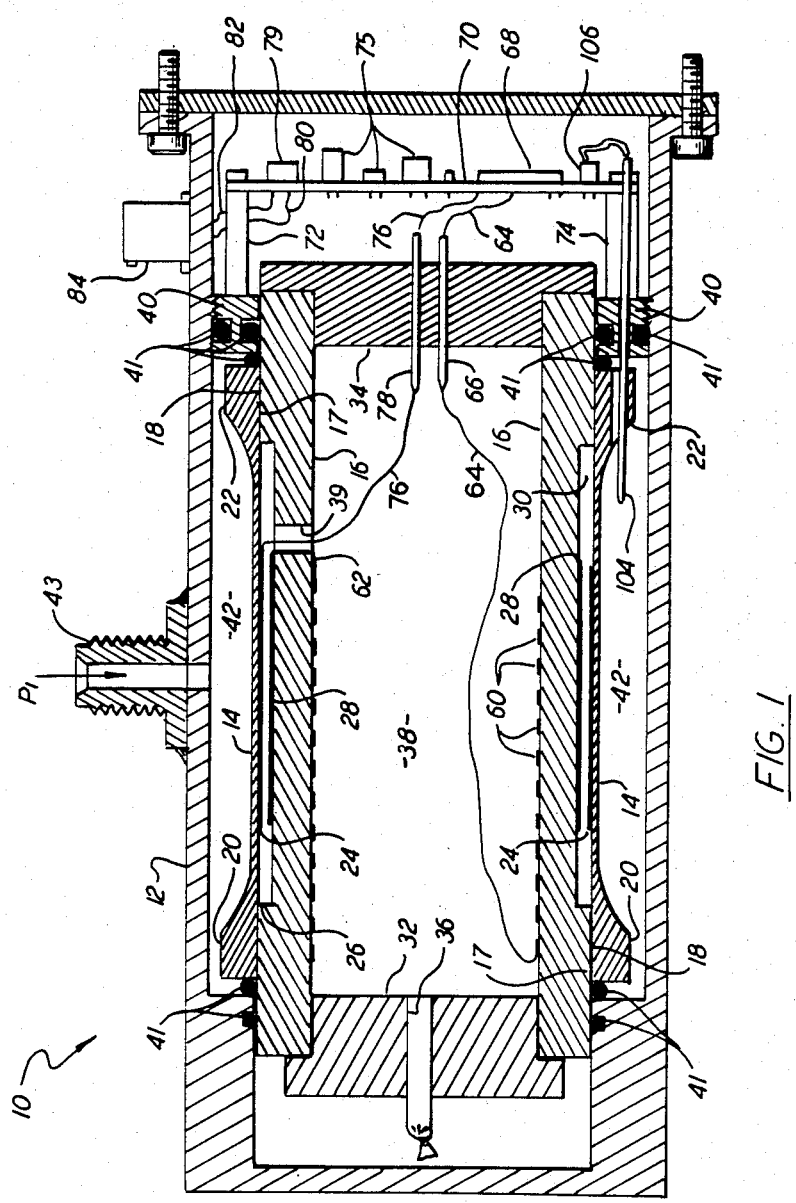
FIG. 1 is a drawing of a capacitive pressure transducer according to the present invention.

In FIG. 1, an illustration of a capacitive pressure transducer assembly 10, according to the present invention. The transducer is cylindrical in shape having an outer housing 12 within which is mounted an outer cylinder tube 14 and an inner cylinder tube 16. Both the outer and inner cylinders are fabricated from a brittle nonconductor such as quartz, aluminum oxide, beryllium oxide, and a glass such as Pyrex ®. It should be understood that although the present transducer is disclosed having a right circular form, the invention can be practiced using housings, inner tubes, and outer tubes having the utilizable shapes, e.g. a right elliptical cylinder, an oblique cylinder, a cylinder having an arbitrarily shaped cross-sectional area, a frustrum of right circular cone, an ellipsoid truncated at each end, etc.

The outer surface of the inner cylinder and the inner surface of the outer cylinder are both metallized near their respective ends 17, 18 where they are joined by brazing. The outer cylinder 14 is machined out of a thick walled tube and has two heavy rings 20, 22 left at each end which gradually taper down to a thin walled flexible cylindrical membrane between the two end rings. The inner wall of the membrane has a layer 24 of electrically conductive material deposited thereon. The inner cylinder has an indentation 26 machined out of its outer wall upon which an electrically conductive layer 28 is also deposited. The electrically conductive layers can be platinum, gold, etc., and can be deposited on the surfaces of the cylinders by electroplating, evaporation deposition, sputtering, formed in the surface as a cermet, or any other suitable method of providing an electrically conductive layer on or in a surface.

A first annular chamber 30 between the inner surface of the outer cylinder and the outer surface of the inner cylinder forms a dielectric gap on the order of one or two thousandths of an inch separating the conductive layers 24, 28 which together form a capacitor, each conductive layer acting as a capacitive plate.

The inner cylinder 16 is sealed at each end with seals 32, 34. Seal 32 has a penetration tube 36 through which all gases within an inner chamber 38 may be evacuated. The tube 36 is then pinched off to preserve the vacuum. The first annular chamber 30 communicates with the inner chamber through a tube 39 which causes the first annular chamber to be at the same pressure as the inner chamber. Of course, the inner and communicating annular chambers need not be evacuated. They could as easily be pressurized at any arbitrary pressure depending on the application.

The inner and outer cylinders together form a capsule which is fixed in position within the outer housing 12 by means of a circular retaining nut 40 which is attached to the outer periphery of the inner cylinder 16 at the end of the inner cylinder in which the seal 34 is inserted. O-rings 41 are inserted between the capsule and the outer housing, the capsule and the retaining nut, and between the outer cylinder and the retaining nut to ensure that a second annular chamber 42 between the outer surface of the outer cylinder and the inner surface of the outer housing is sealed and to provide resiliency in the mounting. Other mounting methods for sealing and resiliently holding the capsule within the housing can as easily be used such as styrofoam, metallic springs, etc.

Pressure ($P_1$) from an external source is introduced via a connector 43 into the second annular chamber 42. In the best mode embodiment, the external pressure ($P_1$) is higher than the pressure within the first annular chamber 30 (which communicates with the inner chamber 38 via the penetration 39 in the inner cylinder 61 wall). The external pressure ($P_1$) exerts compressive forces on the membrane of the outer cylinder causing it to deflect inwards so as to reduce the size of the annular gap 30 between the capacitive plates 24, 28. The capacitance between the plates varies approximately according to the relation:

$$\left[ \frac{(D_1 + D_2)D_3}{(D_1 - D_2)} \right] K_1 = D_c K_1 = C \qquad \text{Equation (1)}$$

Where
$D_1$ is the diameter of the outer cylinder,
$D_2$ is the diameter of the inner cylinder,
$D_3$ is the length of the coating on either cylinder,
$K_1$ is a constant of proportionality having dimensions of charge per unit of electric flux, i.e. permittivity,
$D_c$ equals $[(D_1+D_2)D_3/(D_1-D_2)]$, and
C is the capacitance between the plates.

The membrane flexes in response to changes in the external pressure ($P_1$). The flexions of the membrane are proportional to the changes in the external pressure and effectively cause the diameter of the outer cylinder ($D_1$) in the above relation to change in proportion to the changes in $P_1$. This causes the capacitive value (C) between the plates 24, 28 to also change in proportion to changes in $P_1$.

Figures 2, 3:
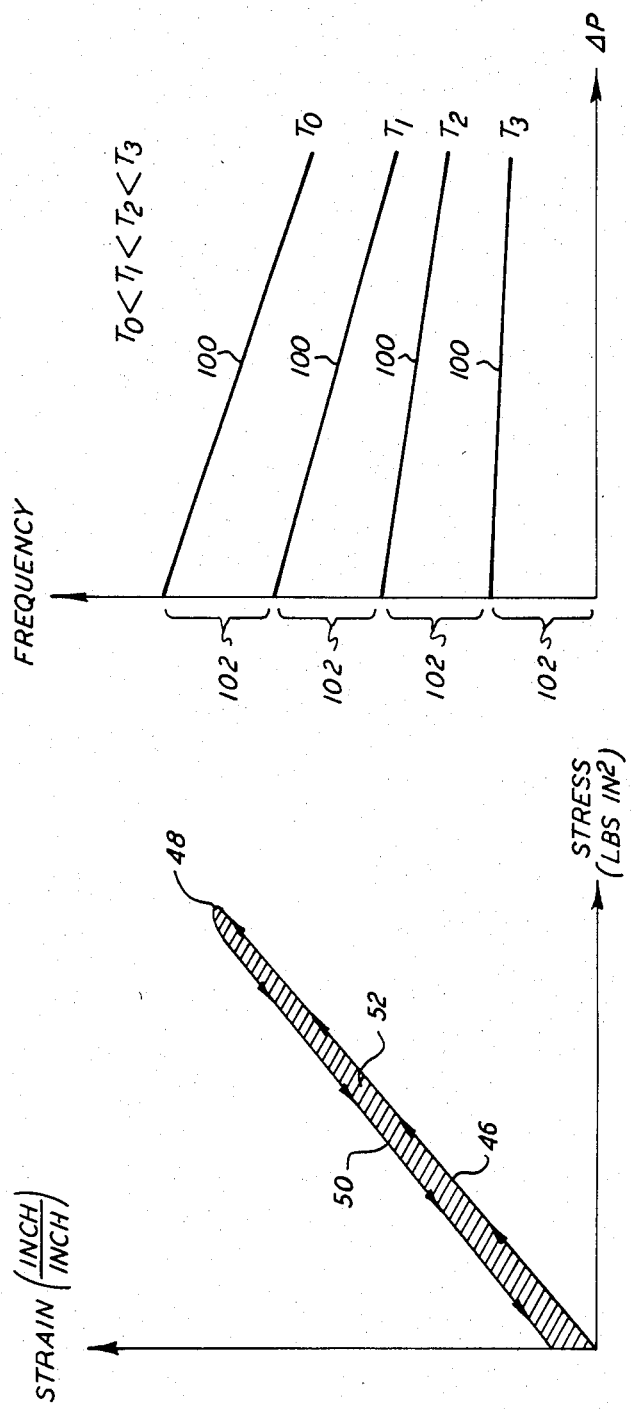
FIG. 2 is a plot of the stress and strain to which the membrane of FIG. 1 is subjected, showing the hysteresis effects exhibited therein.
FIG. 3 is a plot of the frequency output of the transducer of FIG. 1 versus the pressures to which it is subjected at various temperatures.

It cannot be said, however, that the flexions of the membrane and hence, the changes in the value of C with changes in $P_1$ are completely linear. A hysteresis effect is observed in the cyclic flexing of the membrane which is illustrated in FIG. 2. Hysteresis can be defined as the energy dissipated in the cyclic flexing of the membrane between selected limits. If a starting point is selected at the origin of the coordinates of FIG. 2, and the pressure ($P_1$) is gradually increased, the stress and strain on the membrane will increase as shown along the path 46 until an upper selected limit is reached at point 48. At that point the direction of change in the external pressure ($P_1$) is reversed by external means and gradually reduced back toward the origin. As may be seen from the figure, the return path 50 does not coincide with path 46. The slight disparity shown in FIG. 2 between the strain in the membrane along path 46 and along path 50 creates a narrow shaded area 52 which represents the energy dissipated per unit volume in flexing the membrane between the selected limits.

In transducers where a membrane is cyclically deflected and the transducer output depends on the amount of deflection, the hysteresis effect must be minimized in order to maintain a high degree of repeatability in the output. The primary source of the hysteresis effect in the flexions of the membrane of the present embodiment is plastic deformation in the brazed joints 17, 18 under stress (See FIG. 1). A low elastic limit in the solder material between the joints or rubbing in imperfectly welded joints may also contribute to the hysteresis effect. It is an important teaching of my invention that thick end rings 20, 22 of FIG. 1 reduce the stress in the joints and thereby reduce hysteresis, i.e. the total area 52 in FIG. 2 between the selected paths 46, 50 is significantly reduced by using thick end rings. The transitions from the membranes to the rings are of large radii to minimize stress concentration. Together with the end rings, the transitions greatly reduce the stress transmitted to the joints thereby minimizing the hysteresis effect.

In addition to the more or less dynamic hysteresis effect observed during cyclic flexing of the membrane, a comparatively static phenomenon known as creep deformation of the membrane occurs during periods of prolonged exposure to the same pressure. During such periods the membrane becomes stretched resulting in a reduced capacity to maintain the proportional relation between pressure and deflection, i.e. the restraining forces within the membrane are weakened. It is an important teaching of my invention that creep deformation is reduced by using enlarged end rings integral with the outer cylinder's membrane.

The inner wall of the inner cylinder 16 has an inductor 60 deposited in the form of a cylindrical helix. The deposition method is similar to that used in depositing the capacitive plates 24, 28. The inductance of such a multiturn coil may be determined approximately according to the relation:

$$\left[\frac{D_4^2}{aD_4 + bD_5}\right] n^2 K_2 = D_L n^2 K_2 = L \quad \text{Equation (2)}$$

Where $D_4$ is the coil diameter, n is the number of turns, a and b are dimensionless constants, $D_5$ is the length of the cylinder formed by the helical coil, $K_2$ is a constant of proportionality having dimensions of inductance, $D_L$ equals $[D_3^2/(aD_3+bl_2)]$, and L is the inductance of the coil.

One end of the helical coil is electrically connected to the conductive layer 28 by a conductor 62 which may be a wire soldered to the plate 28 at one end and to one end of the coil 62 at the wire's other end, a conductor deposited on the surface by a method similar to those used to deposit the plate 28 and the coil 60, or any other suitable means of electrically connecting the plate 24 to the coil 60. The other end of the inductor is connected to a conductor 64 which may be a rigid or flexible wire, stranded or not, insulated or not, or which may be deposited under or over the inductor coils (having a layer of insulation therebetween) in the same manner used to deposit the plates 24, 28 or the coils 60. Conductor 64 is passed through a penetration 66 in end seal 34 which is then hermetically sealed. After passing through penetration 66, conductor 64 is connected to an oscillator 68, which is usually a voltage controlled oscillator, on a printed circuit board 70 to mounted on standoffs 72, 74 attached to the retaining nut 40. The printed circuit board 70 has other components 75 mounted thereon including phase locked loop circuitry for driving the oscillator 68 at a frequency which varies according to changes in the resonant frequency of a tank circuit having the inductor coils 60 and the capacitor plates 24, 28 as series connected elements. The series connected tank circuit is completed by passing a conductor 76 through a hermetically sealed penetration 78 in end seal 34 and electrically connecting the capacitor plate 24 to the oscillator 68. It should be understood that the inductor coils 60 and the capacitor plates 24, 28 could as easily be connected in parallel so that the oscillator 68 would drive the tank circuit at parallel resonance. In either case, the coils 60 and plates 24, 28 form a tank circuit which has a characteristic resonant frequency which depends on the inductive and capacitive values of the inductor and the capacitor and which is driven at resonance by the oscillator 68 and its associated phase locked loop circuitry which varies the frequency of oscillation according to changes in the resonant frequency of the tank circuit. In other words, the oscillator 68 locks onto whatever the resonant frequency of the tank circuit happens to be and oscillates at that frequency. Since the capacitive plates 24, 28 change their separation according to the changes that occur in the externally applied pressure ($P_1$), the capacitance of the tank circuit will change according to the changes in $P_1$. Thus, for each value of $P_1$, a corresponding tank circuit resonant frequency exists. Output circuitry 79 provides an output signal on wires 80, 82 through a connector 84. The output signal is indicative of the frequency of oscillation of the phase locked loop circuit. However, it should be understood that either frequency or period may be read out. For instance, if a quartz crystal reference clock is used, either the clock or the transducer's resonant frequency may be used to gate the counts from the other.

To read frequency, the number of counts per second (n/t) is required. In a digital circuit a fixed clock frequency is used to set a fixed time interval; if the clock ferquency is fc, the unknown frequency is $f_1$, n, is the number of pulses counted for unknown frequency, and $M_c$ the number of pulses gated for the clock, the measured time interval, $\tau_o$, is nc/fc and this interval is also equal to $n_1/f_1$ so that $f_1 = n_1/\tau_o$. The accuracy of measuring frequency in this way is limited by the fact that the fixed clock and the unknown frequencies are not synchronized. If the first clock pulse occurs just after one of the unknown frequency's pulses and the last occurs just before another, the total count will be inaccurately low by one count, i.e. it will be one count short. If the first clock occurs just before a measured frequency's pulse and the last occurs just after another, the total count will be one count high. The error can thus amount to a maximum of ±1 count of $f_1$. Therefore, $$\frac{f_1 \pm \Delta f}{f_1} = \frac{\left[\dfrac{n_1 \pm 1}{\tau_o}\right]}{\left[\dfrac{n_1}{\tau_o}\right]} = \frac{n_1 \pm 1}{n_1} = 1 \pm \frac{1}{n_1} \text{ and,}$$

$\Delta f/f$, $= \pm 1/n$. But, $1/n_1 = fc/f_1 nc$. Therefore, $\Delta f/f_1 = \pm fc/f_1 nc$. If, in case A, $f_{1A} = 10$ MHz and $fc_A = 2$ MHz, then $\Delta f_A/f_{1A} = \pm 2/10 n_{cA} = \pm 1/5 \, \tau_o f_{cA}$. On the other hand, if in case B, $f_{1B} = 2$ MHz and $f_{cB} = 10$ MHz, then $\Delta f_B/f_{1B} = \pm 10/2\tau_o f_{cB} = \pm 5/\tau_o f_{cB}$. If, as between case A and B, $\tau_o$ is fixed, the ratio of the case A and B errors is:

$$\frac{\frac{\Delta f_A}{f_{1A}}}{\frac{\Delta f_B}{f_{1B}}} = \frac{\frac{\pm 1}{5\tau_o f_{CA}}}{\frac{\pm 5}{\tau_o f_{CB}}} = \frac{f_{cB}}{25 f_{CA}} = \frac{1}{5}.$$

This shows that for output circuitry providing frequency measurement, a tank circuit resonant frequency higher than the clock frequency gives the minimum error.

If the output circuitry provides a period measurement, a fixed number tank circuit cycles are counted to set the measuring time interval ($\tau_o$) and the number of clock pulses occurring during $\tau_o$ are counted. The same sort of error occurs and the error in period ($\Delta T/T_1$) is $\pm f_1/fcn1$. In this case it can be shown that for a given $\tau_o$ the minimum counting error occurs when the clock frequency is higher than the tank circuit resonant frequency.

Referring now to FIG. 3, a family of straight lines 100 are plotted on an external pressure ($P_1$) versus tank circuit frequency coordinate sytem. Each line represents the relationship that exists between changes in the tank circuit's resonant frequency and changes in the external pressure ($P_1$) at a selected temperature. It will be observed from the figure that separately valued "null shifts" 102 exist between successive lines indicative of the differences in tank circuit resonant frequencies at $P_1 = 0$ for successive temperatures. It will also be observed that the slope (scale factor) of the lines decreases with increasing temperature ($T_o$ is the lowest temperature and each successive temperature from $T_o$ to $T_3$ is greater than the preceding temperature).

As a result of the different frequency outputs at different temperatures it is necessary to monitor the temperature of the gas in the second annular chamber 42 (see FIG. 1) by mseans of a temperature sensor 104 which passes through a passage in the printed circuit board standoff, a sealed passage in the retaining nut 40, and a passage in the end ring 22 in order to sense the temperature. The sensor is electrically connected to a circuit 106 which provides a null shift signal indicative of the shift in frequency at $P_1 = 0$ from $T_o$ to the sensed temperature and a scale factor signal indicative of the change in slope of the line associated with the sensed temperature from $T_o$ to the sensed temperature. The output circuitry 79 is responsive to the null shift and scale factor signals as well as frequency and temperature signals and utilizes them to alter the output signal by either increasing or decreasing the measured frequency (or period) according to the magnitude of the signals.

It is an important teaching of my invention that since both the capacitor and inductor are attached to, e.g. a quartz framework, they will change their respective capacitive and inductive values, due to expansion and contraction as a result of temperature changes, in the same ratio. A temperature coefficient $\alpha$ having dimensions of inch/inch °F. changes any initial dimension $D_o$ of the framework according to the relation $D = D_o(1 + \alpha \Delta T)$, where D is the new dimension and $\Delta T$ is the change in temperature in degrees Fahrenheit.

Referring back to equation (1) it will be noted that $D_c$ is actually a generalized expression for all of the length dimensions of the capacitor formed by the plates 24, 28 of FIG. 1. This may be seen in the fact that the actual dimensions of $D_c$ reduce to a simple length, i.e. dimensionally speaking, $D_c$ is a length. The multiplication of each of the individual length quantities ($D_1$, $D_2$, and $D_3$) within $D_c$ by $\alpha \Delta T$ to obtain a new capacitive value is therefore equivalent to multiplying $D_c$ by $\alpha \Delta T$. Referring back to equation (2) it will similarly be noted that $D_L$ is actually a generalized expression for all the length dimensions of the inductor 60 of FIG. 1. Therefore, in order to obtain a new inductive value (L) corresponding to a temperature change $\Delta T$, it is merely necessary to multiply $D_L$ by $\alpha \Delta T$ in the expression $D_L n^2 K_2$ to obtain the new value of L.

If the initial resonant frequency of the tank circuit is $$f_1 = \tfrac{1}{2\pi} \sqrt{L_1 C_1} = 1/K_3 \sqrt{D_{L1} D_{C1}},$$

where $K_3 = 2\pi n^2 K_1 K_2$ as previously defined in equations (1) and (2), and the transducer is subjected to a temperature change $\Delta T$, the frequency after the temperature rise, $$f = \frac{1}{K_3 \sqrt{D_{L1}(1 + \alpha \Delta T) D_{C1}(1 + \alpha \Delta T)}}$$

which can be approximated (neglecting the $[\alpha \Delta T]^2$ term) as:

$$f_2 \approx \frac{1}{K_3 \sqrt{D_{L1} D_{C1}(1 + 2\alpha \Delta T)}}.$$

The percent change in frequency will be:

$$\frac{f_2 - f_1}{f_1} \approx \frac{\frac{1}{K_3}[D_{L1} D_{C1}(1 + 2\alpha \Delta T)]^{-\frac{1}{2}} - \frac{1}{K_3}[D_{L1} D_{C1}]^{-\frac{1}{2}}}{\frac{1}{K_3}[D_{L1} D_{C1}]^{-\frac{1}{2}}}$$

$$\approx (1 + 2\alpha \Delta T)^{-\frac{1}{2}} - 1$$

But since, according to the binomial therein, $(1+x)^{-\frac{1}{2}}$ equals $1 - \tfrac{1}{2}x + \tfrac{3}{8}x^2 - 15/48 x^3 + \ldots$, then $(1 + 2\alpha \Delta T)^{-\frac{1}{2}} \approx 1 - \tfrac{1}{2}(2\alpha \Delta T) + \tfrac{3}{8}(2\alpha \Delta T)^2 + 15/48 - (2\alpha \Delta T)^3 + \ldots$, and since all terms after $\tfrac{1}{2}(2\alpha \Delta T)$ may be neglected, Equation (3)

$$\frac{f_2 - f_1}{f_1} \approx 1 - \alpha \Delta T - 1 \approx -\alpha \Delta T \text{ or, } \frac{\Delta f}{f_1} \approx -\alpha \Delta T.$$

For fused quartz, $\alpha = 0.3 \times 10^{-6}$ inch/inch/°F. and the transducer will therefore have a null temperature shift ($\Delta f/fo \cdot 100\%$) of $-0.00003\%/°F$. and the magnitude of the null shift signal provided by circuit 106 (see FIG. 1) is proportional to this constant.

The deflection of the outer cylinder 14 membrane with pressure is inversely proportional to the mechanical stiffness or the modulus of elasticity (E) of the material. The change in the air gap dimension ($D_1 - D_2$) is therefore also inversely proportional to E and may be expressed:

$$\Delta(D_1 - D_2) = K_4 \Delta P_1 / E \qquad \text{Equation (4)}$$

where
  $K_4$ is a constant of proportionately having dimensions of length,
  $\Delta P_1$ is the change in external pressure applied in compression on the membrane
  E is the modulus of elasticity
  $(D_1 - D_2)$ is the gap between the capacitor plates.

The well known formula for capacitance for a parallel plate capacitor, i.e. $C = kA/x$, which is approximately applicable to this case, where C is the capacitance, k is a constant having dimensions of permittivity, A is the area of each plate, and x is the length of the gap [x is equivalent to $(D_1-D_2)$] in this case between the plates, can be expressed as $C = K_5/x$ where $K_5 = kA$. To find the rate of change of the capacitance with changes in the gap we differentiate:

$$\frac{dC}{dx} = -\frac{K_5}{x^2} \qquad \text{Equation (5)}$$

and the change in capacitance in a particular case may be expressed (by rearranging equation (5) and substituting equation (4) as follows:

$$\Delta C = -\left(\frac{K_5}{x_o^2}\right) \Delta x = -\left(\frac{K_5}{x_o^2}\right)\left(\frac{K_4 \Delta P_1}{E}\right) \qquad \text{Equation (6)}$$

$$\Delta C = K_6 \Delta P_1 / E$$

where
  $\Delta C$ is the change in capacitance,
  $\Delta x$ is the change in the length of the gap and is equivalent to $\Delta(D_1 - D_2)$ of equation (4),
  $x_o$ is the initial (unflexed) length of the gap, and $$K_6 = -K_5 K_4 / x_o^2.$$

The resonant frequency $(f_r)$ is:

$$f_r = \frac{1}{2\pi \sqrt{LC}} = \frac{1}{K_7 \sqrt{C}} \text{ where } K_7 = 2\pi \sqrt{L}.$$

To determine the fractional change in the resonant frequency due to a given $\Delta C$:

$$\frac{f_2 - f_1}{f_1} = \frac{\left(\frac{1}{K_7 \sqrt{C + \Delta C}}\right) - \left(\frac{1}{K_7 \sqrt{C}}\right)}{\left(\frac{1}{K_7 \sqrt{C}}\right)} = \left(1 + \frac{\Delta C}{C}\right)^{-\frac{1}{2}} - 1$$

$$\frac{\Delta f}{f_1} \simeq -\frac{\Delta C}{2C},$$

or substituting equation (6):

$$\frac{\Delta f}{f_1} \simeq -\frac{K_6 \Delta P_1}{2CE},$$

or rearranging, $$\frac{\Delta f}{\Delta P_1} \simeq -\frac{K_6 f_1}{2CE} = S \text{ (scale factor)}.$$

The change in scale factor due to temperature changes in E is:

$$\frac{S_2 - S_1}{1} = \frac{\left(\frac{K_6 f_1}{2E\left(1 + \frac{\Delta E}{E}\right)C}\right) + \left(\frac{K_6 f_1}{2EC}\right)}{-\left(\frac{K_6 f_1}{2EC}\right)} =$$

$$-\left(\frac{1}{\left(1 + \frac{\Delta E}{E}\right)}\right) + 1$$

$$\frac{\Delta S}{S_1} \simeq -\frac{\Delta E}{E}$$

Since $\Delta E / \Delta T$ for quartz is 0.007%, then $$\frac{\Delta S}{S_1} = -0.007\%/°F. \qquad \text{Equation (7)}$$

Both the null shift obtained from equation (3) and the scale factor change of equation (7) may be expressed in terms of a percentage of full scale deflection. Since the transducer of my invention can easily be made to give a total capacitance change of approximately 25% over the selected pressure range without stressing it very highly, the corresponding full scale frequency change $\Delta f_{MAX}$ about a selected frequency would be (for a typical transducer):

$$\Delta f_{MAX} = \frac{1}{K_7 \sqrt{1.25C}} - \frac{1}{K_7 \sqrt{C}} \simeq 10\%$$

of the center frequency.

In terms of full scale deflection then, the null temperature shift (NTS) is:

$$NTS = \frac{0.00003\% \text{ of selected frequency}/°F.}{0.10 \text{ of selected frequency/full scale}}$$

$$= 0.0003\% \text{ of full scale}/°F.;$$

and the scale factor change (SFC) is:

$$SFC = \frac{-0.007\% \text{ of selected slope}/°F.}{0.10 \text{ of selected slope/full scale}}$$

$$= -0.07\% \text{ of full scale}/°F.$$

Referring back to FIG. 3, it should be understood that the lines 100 shown are in reality not entirely linear. There is typically about a four percent deviation from linearity from one end of the capacitive range to the other (for a given temperature). This nonlinearity is corrected by the circuitry 106 which provides a linearity correction factor signal to the output circuitry 79 which utilizes it to alter the output signal accordingly in a fashion similar to the manner in which the null shift and scale factor signals are utilized.

Although the invention has been described as utilizing a brittle material for construction of the sensing cylinder, it should be understood that another material exhibiting plastic deformation, such as metal, could be used.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

I claim:

1. A capacitive pressure transducer comprising:
   outer cylinder means, having two thick walled open end rings, one at each end of said outer cylinder, which gradually taper down to form a thin walled flexible cylindrical membrane between the two end rings, said membrane having an electrically conductive layer on its inner surface to form a first capacitor plate;
   inner cylinder means, concentrically mounted within said outer cylinder means, having rigid walls with an electrically conductive layer on the outer surface to form a second capacitor plate, said inner cylinder outer walls mating with said outer cylinders end rings such that a sealed first annular chamber is formed between said first capacitor plate and said second capacitor plate, said inner cylinder being sealed at its ends to form an inner chamber therewithin for containing a gas under an inner chamber pressure, said annular chamber communicating with said inner chamber through a perforation in the wall of said inner cylinder such that said first annular chamber and said inner chamber are at the same pressure; and
   housing cylinder means, having said inner and outer cylinders mounted concentrically therein thereby forming a second annular chamber between the outer walls of said outer cylinder and the inner walls of said housing cylinder and having means for introducing a gas under a variable pressure higher than said inner chamber pressure into said second annular chamber thereby exposing said outer wall of said outer cylinder to a variable outer pressure higher than said inner chamber pressure, said outer pressure causing said membrane to deflect towards said rigid wall such that the distance between said first capacitor plate and said second capacitor plate is decreased according to the difference between said inner chamber pressure and said variable outer pressure thereby varying the capacitance between said plates in proportion to said difference.

2. The capacitive pressure transducer of claim 1, wherein said inner cylinder means includes:
   inductor means, integral to the inner wall of said inner cylinder and having the form of a cylindrical helix.

3. The capacitive pressure transducer of claim 2, further comprising:
   means for series or parallel connecting said capacitor plates and said inductor to an oscillator circuit mounted within said housing cylinder that oscillates at either the series or parallel resonant frequency of said series or parallel connected circuit, that changes its frequency of oscillation to match changes in said resonant frequency due to changes in the capacitance between said plates, and that provides said frequency of oscillation as an output signal having a frequency indicative of the value of said outer pressure.

4. The capacitive pressure transducer of claim 2, further comprising:
   temperature sensor means, responsive to the temperature of said gas within said second annular chamber for providing a temperature signal indicative thereof.

5. The capacitive pressure transducer of claim 2, further comprising:
   circuit means, responsive to said temperature signal for providing a signal to correct the null shift and scale factor shift due to temperature changes.

6. A capacitive pressure transducer comprising:
   outer cylinder means, having open ends and having a flexible membranous cylindrical wall, said wall having an electrically conductive layer on its inner surface to form a first capacitor plate;
   inner cylinder means, concentrically mounted within said outer cylinder means, having rigid walls with an electrically conductive layer on the outer surface to form a second capacitor plate, said inner cylinder mating with said outer cylinder such that a sealed first annular chamber is formed between said first capacitor plate and said second capacitor plate, said inner chamber being sealed at its ends to form an inner chamber therewithin for containing a gas under an inner chamber pressure, said annular chamber communicating with said inner chamber through a perforation in the wall of said inner cylinder such that said first annular chamber and said inner chamber are at the same pressure;
   inductor means, integral to the inner wall of said inner cylinder means and having the form of a cylindrical helix; and
   housing cylinder means, having said inner and outer cylinders mounted concentrically therein thereby forming a second annular chamber between the outer walls of said outer cylinder and the inner walls of said housing cylinder and having means for introducing a gas under a variable pressure higher than said inner chamber pressure into said second annular chamber thereby exposing said outer wall of said outer cylinder to a variable outer pressure higher than said inner chamber pressure, said outer pressure causing said membrane to deflect towards said rigid wall such that the distance between said first capacitor plate and said second capacitor plate is decreased according to the difference between said inner chamber pressure and said variable outer pressure thereby varying the capacitance between said plates in proportion to said difference.

7. The capacitive pressure transducer of claim 6, further comprising:
   means for series or parallel connecting said capacitor plates and said inductor to an oscillator circuit mounted within said housing cylinder that oscillates at either the series or parallel resonant frequency of said series or parallel connected circuit, that changes its frequency of oscillation to match changes in said resonant frequency due to changes in the capacitance between said plates, and that provides said frequency of oscillation as an output signal having a frequency indicative of the value of said outer pressure.

8. The capacitive pressure transducer of claim 6, further comprising:

temperature sensor means, responsive to the temperature of said gas within said second annular chamber for providing a temperature signal indicative thereof.

9. The capacitive pressure transducer of claim 6, further comprising:

circuit means, responsive to said temperature signal for providing a signal to correct the null shift and scale factor shift due to temperature changes.

* * * * *